United States Patent [19]
Tran et al.

[11] Patent Number: 5,255,196
[45] Date of Patent: Oct. 19, 1993

[54] CUSTOM RATE PACK FOR POSTAGE SYSTEMS

[75] Inventors: Diem P. Tran, Fremont; Mary C. Au, Union City, both of Calif.

[73] Assignee: f.m.e. Corporation, Hayward, Calif.

[21] Appl. No.: 597,931

[22] Filed: Oct. 15, 1990

[51] Int. Cl.$^5$ .............................................. G07B 17/00
[52] U.S. Cl. ........................... 364/464.03; 364/464.02; 177/25.15
[58] Field of Search ............... 364/464.02, 464.03, 364/466; 177/25.15

[56] References Cited

U.S. PATENT DOCUMENTS

| | | | |
|---|---|---|---|
| 4,084,242 | 4/1978 | Conti | 364/464.03 |
| 4,122,532 | 10/1978 | Dlugos et al. | 364/900 |
| 4,320,461 | 3/1982 | Dlugos | 364/464.02 |
| 4,345,193 | 8/1982 | Barger et al. | 318/612 |
| 4,377,214 | 3/1983 | Hansen et al. | 364/466 X |
| 4,421,977 | 12/1983 | Kittredge | 235/101 |
| 4,427,969 | 1/1984 | Coppola et al. | 235/101 X |
| 4,462,473 | 7/1984 | Valestin | 364/464.03 X |
| 4,472,781 | 9/1984 | Miller | 364/466 |
| 4,481,604 | 11/1984 | Gilham et al. | 364/900 |
| 4,495,581 | 1/1985 | Piccione | 364/464 |
| 4,498,187 | 2/1985 | Soderberg et al. | 364/466 X |
| 4,499,545 | 2/1985 | Daniels et al. | 364/200 X |
| 4,506,329 | 3/1985 | Duwel et al. | 364/900 |
| 4,506,330 | 3/1985 | Dlugos | 364/466 |
| 4,516,014 | 5/1985 | Eckert | 235/101 |
| 4,516,209 | 5/1985 | Scribner | 209/900 X |
| 4,519,048 | 5/1985 | Abellana et al. | 364/900 |
| 4,535,419 | 8/1985 | Dlugos et al. | 364/900 |
| 4,569,022 | 2/1986 | Coppola et al. | 364/466 |
| 4,584,648 | 4/1986 | Dlugos | 364/900 X |
| 4,628,457 | 12/1986 | Manduley | 365/226 X |
| 4,628,476 | 12/1986 | Duwel | 364/900 |
| 4,637,051 | 1/1987 | Clark | 382/1 |
| 4,641,346 | 2/1987 | Clark et al. | 380/3 |
| 4,641,347 | 2/1987 | Clark et al. | 380/3 |
| 4,660,221 | 4/1987 | Dlugos | 380/23 |
| 4,718,506 | 1/1988 | Hills | 364/567 X |
| 4,739,343 | 4/1988 | Dolan | 346/76 PH |
| 4,760,532 | 7/1988 | Sansone et al. | 364/466 |
| 4,760,534 | 7/1988 | Fougere et al. | 364/466 |
| 4,787,046 | 11/1988 | Feinland et al. | 364/464.03 X |
| 4,797,830 | 1/1989 | Baggarly et al. | 364/464.03 |
| 4,800,505 | 1/1989 | Axelrod et al. | 364/478 |
| 4,809,186 | 2/1989 | Freeman et al. | 364/464 |
| 4,812,994 | 3/1989 | Taylor et al. | 364/464.02 |
| 4,817,002 | 3/1989 | Sansome et al. | 364/200 |
| 4,829,443 | 5/1989 | Pintsov et al. | 364/464.03 |
| 4,831,554 | 5/1989 | Storace et al. | 364/519 |
| 4,839,813 | 6/1989 | Hills et al. | 364/464.03 |
| 4,843,560 | 6/1989 | Ichikawa | 364/464.02 |
| 4,853,864 | 8/1989 | Hart et al. | 364/464.02 |
| 4,864,521 | 9/1989 | Feinland | 364/567 |
| 4,868,757 | 9/1989 | Gil | 364/464.03 |
| 4,872,119 | 10/1989 | Kajimoto | 364/464.03 |
| 4,900,903 | 2/1990 | Wright et al. | 235/381 X |
| 4,900,904 | 2/1990 | Wright et al. | 235/381 |
| 4,910,686 | 3/1990 | Chang et al. | 364/464.02 X |
| 4,916,626 | 4/1990 | Vermesse | 364/480 |

OTHER PUBLICATIONS

Advertising brochure, Friden Alcatel 8865 Scale, Jul. 1989.

*Primary Examiner*—Edward R. Cosimano
*Attorney, Agent, or Firm*—Townsend and Townsend Khourie and Crew

[57] ABSTRACT

An improved postage scale (2). The scale contains a central processing unit (200) which calculates the amount of postage required for an article to be mailed. The central processing unit inputs rate information from battery augmented random access memory (208). A user programs the random access memory using the same keyboard (6) used for normal weighing operations. In preferred embodiments memory pack, including the battery augmented random access memory (208), is inserted in external slot (10) in the postage scale for added versatility.

20 Claims, 9 Drawing Sheets

Microfiche Appendix Included
(172 Microfiche, 2 Pages)

CUSTOM RATE PACK FOR POSTAGE SYSTEMS

MICROFICHE APPENDIX

This application includes a microfiche Appendix 1 having 2 sheets totaling 172 frames.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention generally relates to the field of postage equipment and their operation and, specifically, to postage scales.

Postage scales and meters are well known to those of skill in the art and have come to be widely used in most business offices. Such systems provide users with a wide variety of capabilities, including the ability to weigh an item, select a desired postage service, enter information relating to the destination of the item, and quickly determine the amount of postage due on the item. Such scales can further communicate with a postage meter or postage register. Postage meters provide the further ability to issue the postage due for the item and maintain accounting information for a particular user.

While meeting with substantial success, prior postage meters and scales have also met with certain limitations. For example, many postage scales rely on one or more ROM packages for storage of rate tables. Such tables are normally updated by a vendor who sends a new ROM package to the user each time rate tables are changed by one or more postage providers. The user or vendor then replaces a prior ROM package with the updated ROM package.

Such systems are subject to a variety of limitations. For example, a user is able to access rate information for only those postal systems and services which the vendor updates or supports. Often a user wishes to have access to rate information which is not normally supported by the vendor. In some cases it would be desirable for distributors and the like to easily provide local customers with rate packs not available from the manufacturer.

From the above it is seen that an improved postage scale and associated components are needed.

SUMMARY OF THE INVENTION

The invention is drawn to an improved postage scale and associated method of operation. The invention provides for the use of a random access memory or nonvolatile read/write memory, preferably battery augmented, for storage of custom rate information which is programmed by the user, postage service provider, or the like. A program for entry of the user-supplied rate information is stored on a ROM which temporarily replaces operating software in the scale in one embodiment. The program prompts the user for entry of custom rate data, which is stored on the random access memory.

Accordingly, in one embodiment the invention is incorporated into a postage scale which includes means for determining a weight of an article to be mailed, and means for calculating an amount of postage required for the article based on the weight thereof and stored rate information. The means for calculating includes central processing means programmed to input postage rate data and the weight of the article, and output the amount of postage required. Storage means stores the rate data, which are input by a user from a scale interface. The scale further includes means for indicating the amount of postage required for the article.

A further understanding of the nature and advantages of the inventions herein may be realized by reference to the remaining portions of the specification and the attached drawings.

BRIEF DESCRIPTION OF THE DRAWINGS

FIG. 2a illustrates the CPU and each of its available memory modules while FIGS. 2b and 2c illustrate installation of the modules during operation of the scale according to one aspect of the invention;

DESCRIPTION OF THE PREFERRED EMBODIMENTS

CONTENTS
 I. Overall Description
 II. Hardware Description
 III. Software Description
 IV. User Operation
 V. Conclusion

I. Overall Description

The present invention provides a method and system which enables a user, distributor, or the like to easily install custom rate information in a postage scale. The system will find particular application when a user or distributor desires to select a mail service which is not supported (i.e., for which rate information, generally in the form of ROM packs, are not distributed on a regular basis) by the postage scale manufacturer.

A user or distributor programs and stores rate data for custom postage services. The data are stored on a battery augmented random access memory (BAM) custom data storage pack and, preferably, downloaded to the onboard CPU BAM when needed. Once the rate data are downloaded to the CPU BAM, data are resident for normal operation in conjunction with the data which are currently only available from a vendor in the form of replaceable ROM. Custom data may optionally be checked by printing to an attached printer.

In a preferred embodiment, selected portions of memory used by the scale (such as the custom rate BAM, the CPU operating software, vendor-supplied rate information, and a program for inputting custom rate data) are provided in the form of removable memory packs. Such packs are conveniently inserted or removed from the postage scale via exterior slots provided in the scale.

Figure 1:
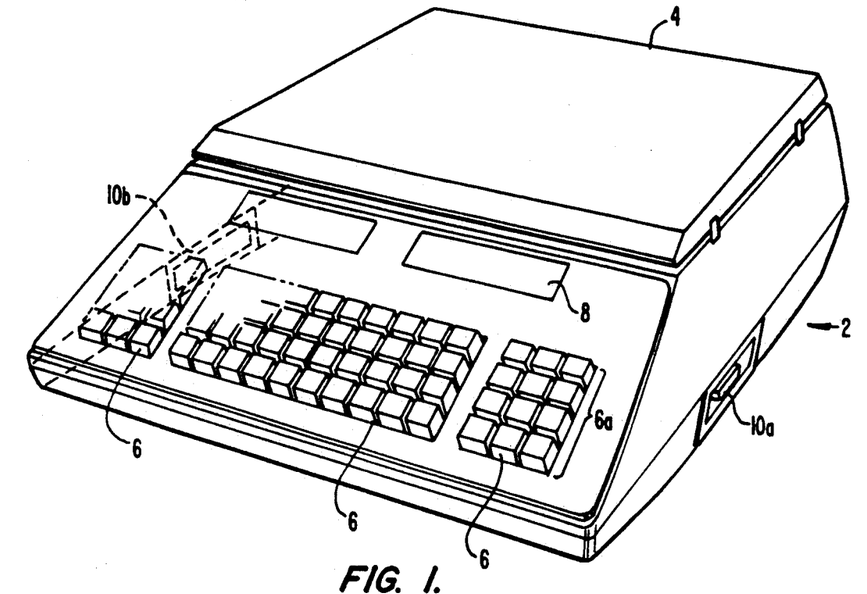
FIG. 1 is an isometric view of a postage scale in accordance with one embodiment of the invention.

FIG. 1 is an isometric view of a postage scale in accordance with one embodiment of the invention. The scale includes a body 2 on which a weighing surface 4 is provided. On a front portion of the scale, a keyboard 6, and display 8 are provided for user input to the scale. The basic components of postage scales are well known to those of skill in the art and are used in prior scales including, for example, model no. 8865 manufactured by Friden Alcatel.

According to the invention herein, the scale includes 2 or more slots 10a and 10b for insertion of memory modules. These slots are used for selective insertion and use of a custom rate program ROM pack, a custom rate data BAM pack, a directory ROM pack, a shipping transaction BAM pack, an operating system ROM pack, and a BAM pack for storage of accounting information and the like. Conveniently, the directory pack in preferred embodiments is located inside the scale such that limited access thereto is provided.

The custom program rate pack is a read only memory containing a menu driven program which allows the customer to program rate tables for several (e.g., four) custom rate selection keys 6a. The directory pack is used, for example, to hold information regarding the enablement of user programmability of a custom data pack, the maximum weight which may be placed on the scale, user name, zip/zone information, user option data, and other basic information regarding the specific scale. The custom rate data BAM pack is comprised of battery backed-up random access memory which is programmed by the user to contain custom rate information. In preferred embodiments, the battery for the pack is located inside the pack. In one embodiment, the custom rate pack has capacity of about 128K, of which substantially less is used in most instances (e.g., 32K). One or more of the slots may also be used for insertion of a read only memory pack such as those previously used in postage meters and replaced periodically by the vendor for providing standard rate information and/or normal operating system software. One or more of the slots is also used for insertion of the shipping transaction BAM pack, which is used for storage of accounting information in accordance with well known prior systems. By "pack" it is intended to mean herein a modular pack containing the selected memory type and providing an interconnect for a socket or plug assembly in the scale body. The pack will usually include environmental protection such as a plastic case.

In some embodiments, the keys 6 used in normal operation of the scale are also used for programming of the battery backed up custom rate pack. In some embodiments, user programmability is an option and is controlled by assigning, enabling, or disenabling variables to the custom rate keys in the directory pack.

II. Hardware Description

Figure 2A:
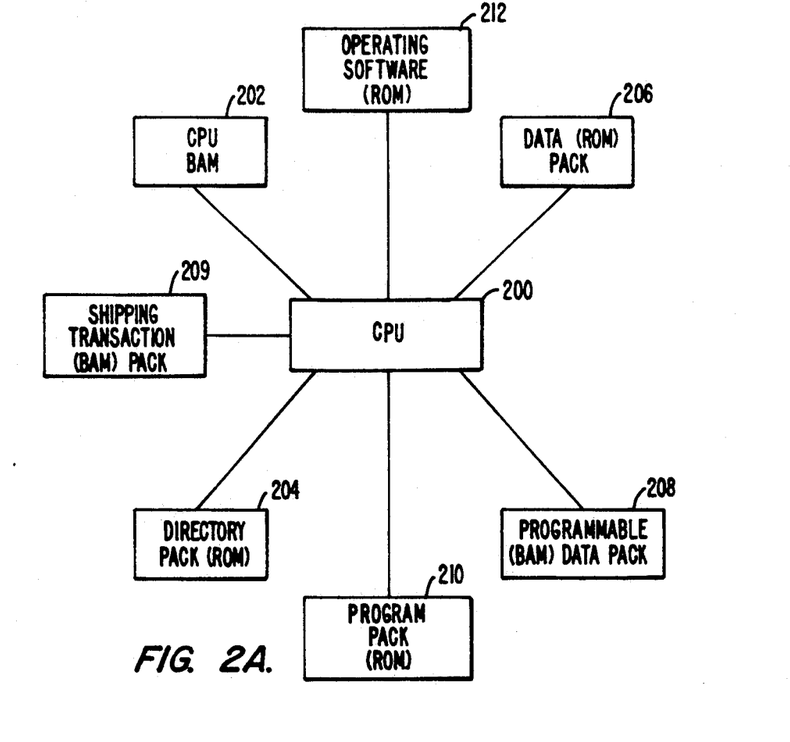
FIGS. 2a and 2c are block diagrams illustrating the electronic components used herein. Specifically.

FIG. 2 is an overall block diagram of the hardware components used according to one embodiment of the postage scale herein. The postage scale includes a central processing unit 200 of the type well known to those of skill in the art. CPU 200 is in one embodiment a model no. 8088 made by Intel. Connected to the CPU is a CPU BAM 202 which may be, for example, 32K of battery backed-up random access memory. CPU BAM 202 is used for storage of data which are of immediate need in the CPU 200 and in the embodiments herein generally contains rate data downloaded from the BAM pack 208. CPU 200 also has access to a directory pack 204 which will generally be ROM (about 8K) which is used for option enabling variables, and the like. The directory pack will generally be installed inside the scale where user access is limited.

The CPU is also provided with access to permanent rate data storage ROM pack 206 and shipping transaction storage BAM pack 209. ROM 206 is preprogrammed, generally by the system vendor, with updated rate information for one or more commonly used postal systems. ROM 206 and BAM 208 may be provided with separate installation slots, or installed in a single slot on an alternating basis. In still further embodiments, the ROM 206 is integral with an operating system software pack 212 and inserted into a common slot therewith. Custom rate program pack 210 is generally read only memory containing a program for checking to determine if the user may program custom data packs and, if so, initiating and carrying out the user programming. Operating software (ROM) pack 212 is a removable ROM containing the normal operating software used by the postage scale. In one embodiment the programmable rate pack 210 is installable alternately in a slot of the scale normally holding the operating software/data pack 212/206.

Programmable BAM data pack 208 is about 128K of battery backed-up random access memory, such memory being available in, for example, model no. 8865, made by Friden Alcatel. This pack is used for storage of custom rate information input by, for example, the scale use. Often such custom rate information for non-standard postal services, foreign postal services, or the like which are not supported by the scale manufacturer, who will normally provide updated information for standard postal rates through new ROM packs 206.

Figure 2B:
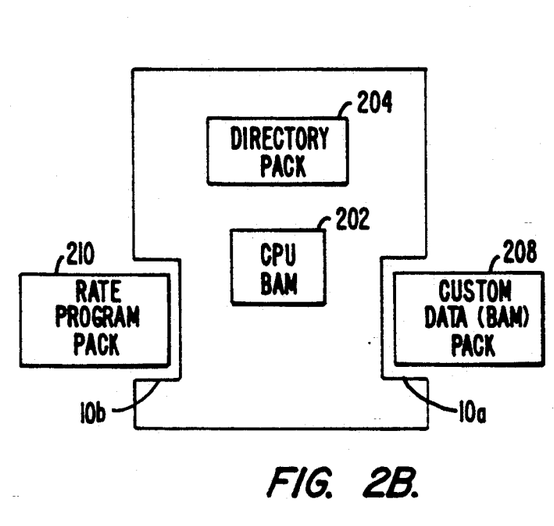
Figure 2C:
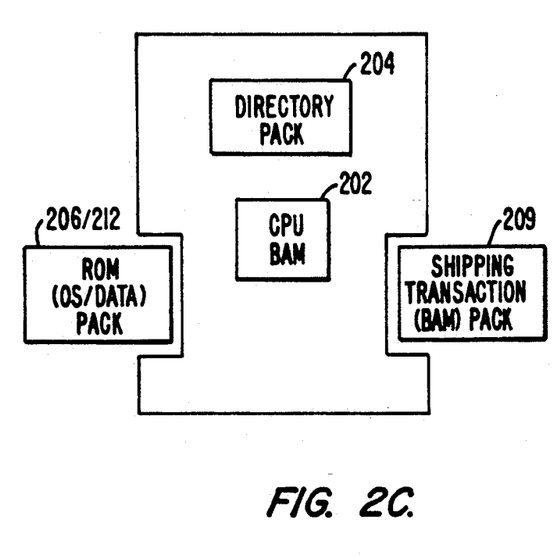

FIGS. 2b and 2c illustrate one possible configuration of the various memory modules in a postage scale during programming and normal use of the scale. As shown in FIG. 2b, the directory pack is installed inside of the scale and contains option data, as well as the various other parameters listed above. During programming of custom rate information, the user installs the custom rate program pack (ROM) 210 in one slot of the scale. In another slot of the scale, the user installs the custom data (BAM) pack 208 into a second slot on the scale. The user then programs the custom data into the battery backed up BAM 208 under the direction of the program stored in ROM 210 via the scale keyboard in preferred embodiments.

After completion of the programming, the information is downloaded from the BAM 208 into the BAM 202 for normal use and the custom rate BAM 208 is removed from its slot, along with the rate program pack 210. Thereafter, as shown in FIG. 2c, the user installs the ROM operating system, data pack 206/212 into the slot previously used for the rate program pack 210. The user then installs the shipping transaction BAM 209 into the slot previously used for the custom data BAM pack 208. The BAM 208 may then be used for archival purposes or downloaded into numerous other scales such that every scale need not be programmed. This programmable BAM will provide particular benefits to, for example, large organizations having many scales which require postage rate data not normally supported by the scale manufacturer, or to dealers of scales who wish to provide support of unusual postage systems which are not supported by the manufacturer of the scale. The scale, with the data packs 206/212 and 209 installed, is then used for normal weighing operations.

III. Software Description

Appendix 1 (Copyright 1990, f.m.e. Corporation, All Rights Reserved) is a copy of a C+ Intel Assembly Code 8088 program for the custom rate program pack and which is used to program custom information into the BAM 208. FIGS. 3a to 3f are flowcharts illustrating operation of the major operations executed by the software. The program illustrated herein is designed for 32K BAM to store custom rates. It will be apparent, however, that larger or smaller amounts of custom rate information could readily be stored without departing from the scope of the invention herein.

The custom rate program disclosed in Appendix 1 operates within the following design parameters:

Four custom rates and, therefore, four custom rate keys are available for programming by a user.
Each custom rate allows up to 10 rate codes/zones.
The rate table has 300 entries maximum.
The maximum rate is $655.35.
The maximum weight allowed in the table is the maximum weight of the particular scale as assigned in the directory pack.

Figure 3A:
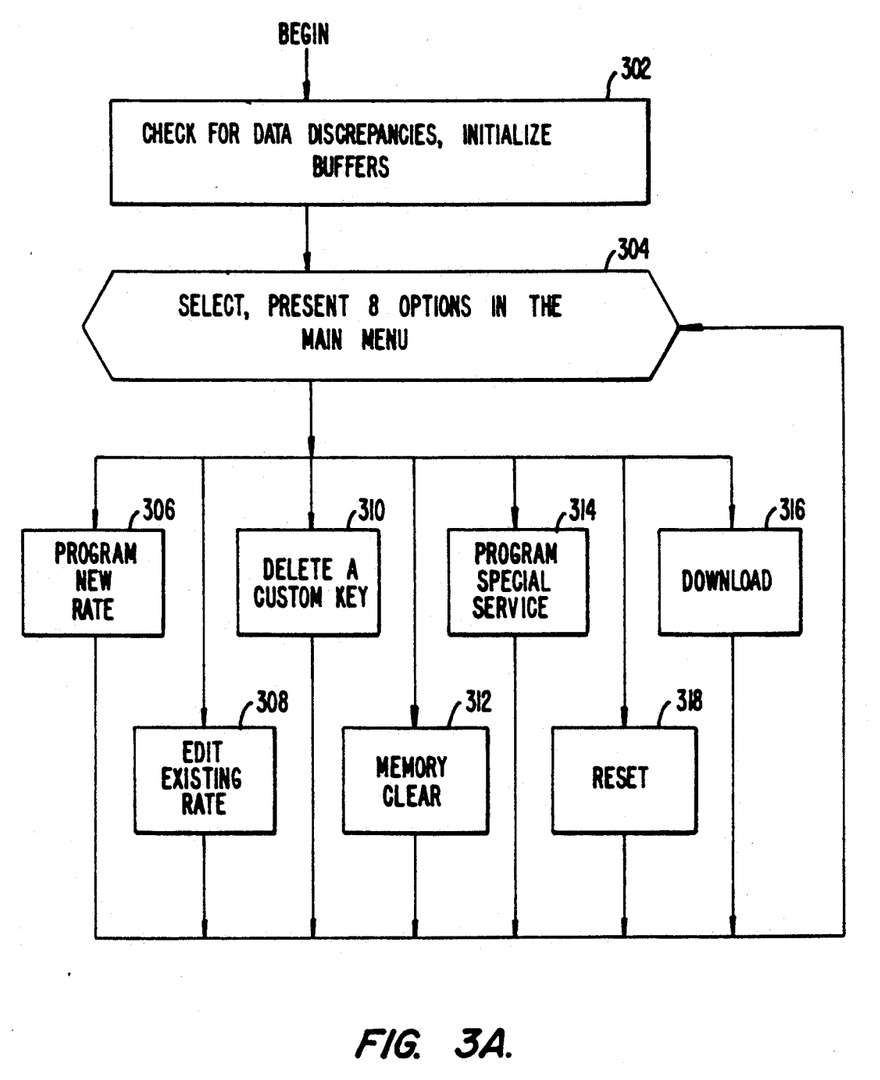
FIGS. 3a to 3f are block diagrams illustrating operation of the software system herein for programming custom rate information on a BAM.

Referring to FIG. 3a, at power-up, the scale checks the BAM at step 302 for any data discrepancies and initializes its buffers in the system before entering the rate programming mode. Thereafter, at step 304, the system prompts the user to select one of six operating modes, i.e., the programming of a new rate 306, the editing of an existing rate 308, the deletion of a single custom rate key's information 310, clearing of all custom rate memory 312, programming of a special postal service such as insurance, or a flat fee for certified delivery 314, or downloading of the custom rate information to the CPU BAM 316. At any stage of the process the user may utilize a reset operation 318 to delete any new information which has just been entered and return to step 304.

Figure 3B:
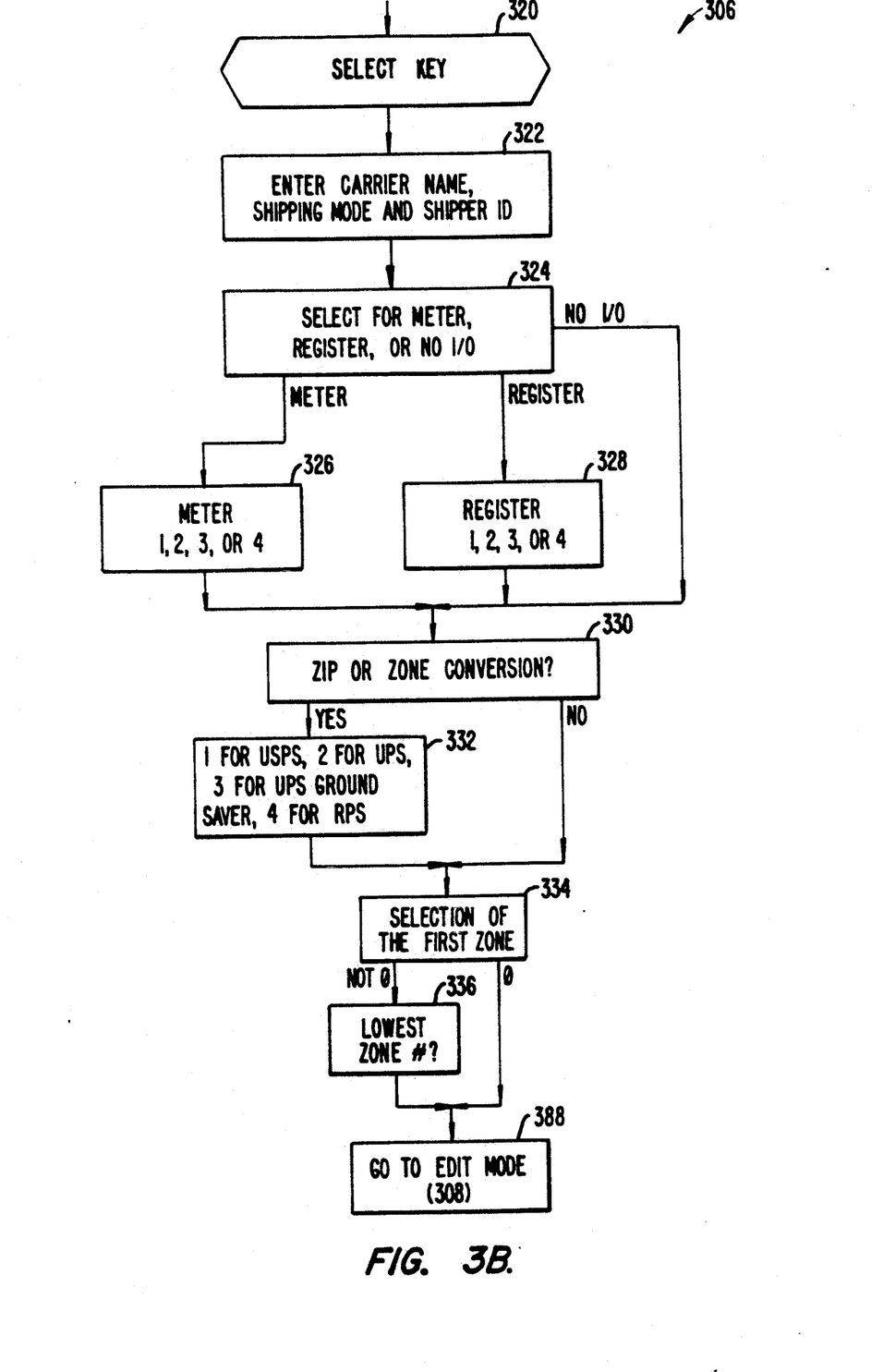

FIG. 3b illustrates the new rate programming step 306 in greater detail. At step 320 the system prompts the user and inputs the desired key for entry of rate information (such as 1, 2, 3, or 4). At step 322 the user is prompted for and enters a carrier name, shipping mode, shipper ID, and other alphanumeric information to be associated with the new rate to be entered. At step 324 the system then prompts the user and inputs a selection between output to a meter, a register, or no input/output. If the user selects a meter or register, at steps 326 or 328, respectively, the system prompts and inputs the appropriate meter or register 1, 2, 3, or 4. If the user selects no input/output ("NO I/O") step 324, the system goes directly to step 330. Thereafter, at step 330 the system prompts the user to select between the use of zip or zone conversion or no use of zip or zone conversion in calculation of postage according to means well known to those of skill in the art. If the user selects zip or zone conversion, the system prompts at step 332 for which conversion system is to be utilized such as United States Postal Service, United Parcel Service, UPS Ground Saver, or RPS (Roadway Packaging Systems). Thereafter, the system prompts the user and inputs a selection of the first zone for which rate information is to be entered at step 334. If the user selects "NO" at step 330, the system goes to step 334. If the first zone is not zero, the system determines at step 336 if this is the lowest zone number so as to ensure that all zones are entered. Thereafter, the system executes the same series of steps for the selected zone as are carried out in the edit mode at step 388. At step 334, if the first zone selected is zero, the system goes to the edit mode at step 388.

Figure 3C:
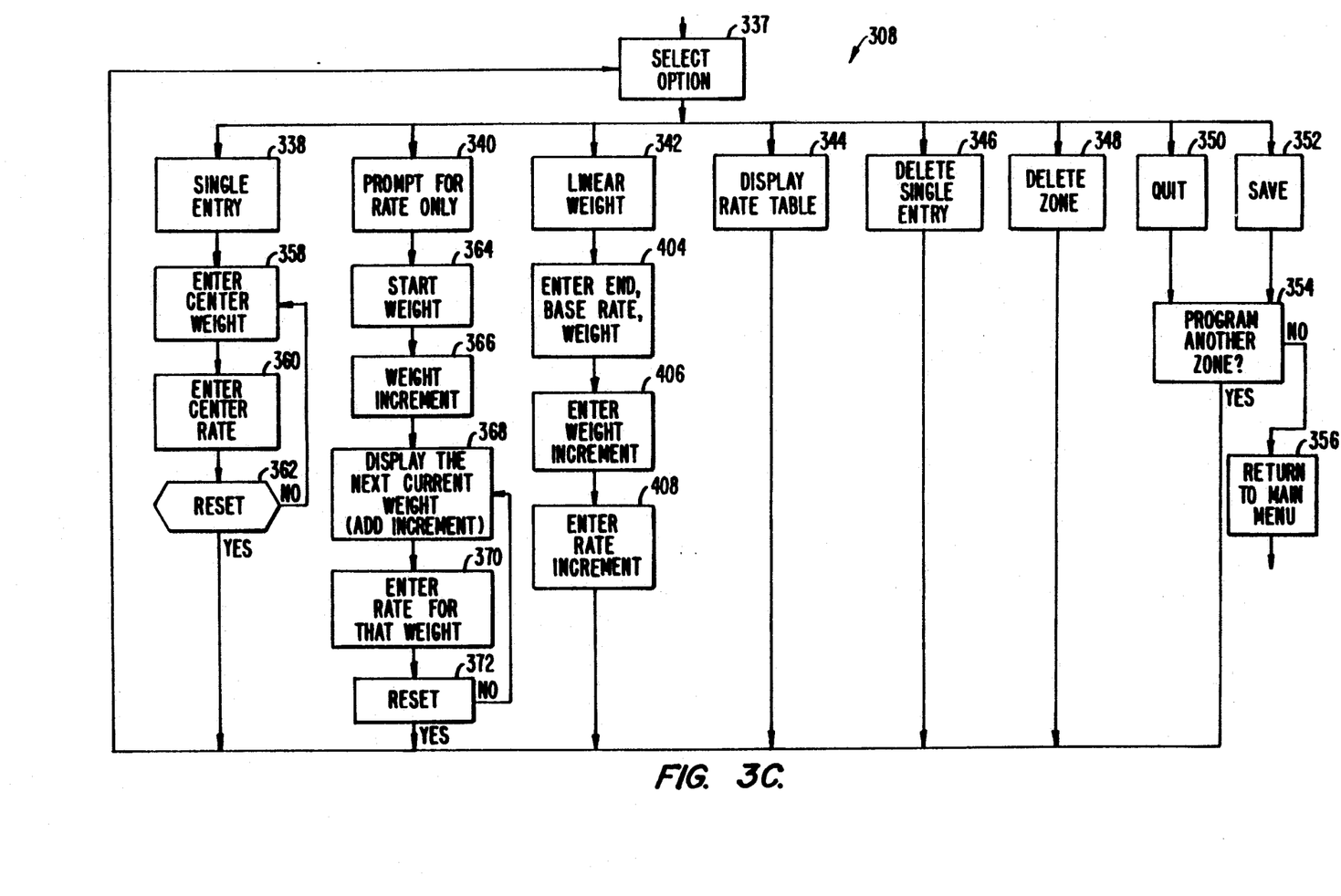

FIG. 3c illustrates operation of the edit step or mode 308 in greater detail. As shown in FIG. 3c, the system first presents the user with a series of options for editing of the rate information at step 337. Frequently used options in entering rate information include single entry 338, linear weight entry 342, and prompt for rate only entry 340. The system also presents options for the user to display a rate table for the given zone as shown in step 344, to delete a single entry (step 346), to delete an entire zone of information (step 348), to quit the edit mode (step 350), or to save information which has been entered (step 352). If the user elects to delete a single entry (step 346) or to delete an entire zone of information (step 348), the system prompts the user to input the desired entry or the desired zone of information to be deleted. After the information has been deleted, the system returns to the select option mode (step 337). If the user elects to quit the edit mode or to save entered information, the program prompts the user to determine if another zone of rate information is to be entered at step 354. If so, the system returns to the select option mode 337. If not, the system returns the user to the main menu (step 304) at step 356.

If the user selects the single entry mode, the system prompts the user for input of single entry rate information, i.e., information in which a single, fixed rate applies for any weight in a given range, and in which a separate rate must be entered for each weight range. In the particular embodiment shown herein the program prompts and inputs the center weight in the range at step 358, and prompts for and inputs the rate for this weight range at step 360. The program then determines if the reset key is struck at step 362 and, if not, returns to step 358. If the reset key is struck, the system returns to the edit menu 337.

If the user selects the prompt for rate only mode 340, the system inputs and stores rate information for each weight in successive and equal weight ranges or increments. For example, the user may at step 364 enter a start weight, and a weight increment at step 366. Thereafter, the program displays the current weight at step 368, enters the rate for that weight increment at step 370, and determines if the user has struck reset at step 372. If not, the system increments the current weight by the increment, and prompts for the rate for that next increment. If the user struck reset, the system returns to the edit menu.

If the user selects linear weight entry (step 342), i.e., a rate system in which postage is calculated on the basis of a base cost plus an incremental charge for each incremental unit of weight, the system prompts for and inputs a base weight, end weight, and base rate at step 404. Thereafter, at step 406, the system prompts for and enters the rate increment at step 408 and then returns the user to the edit menu.

Figure 3D:
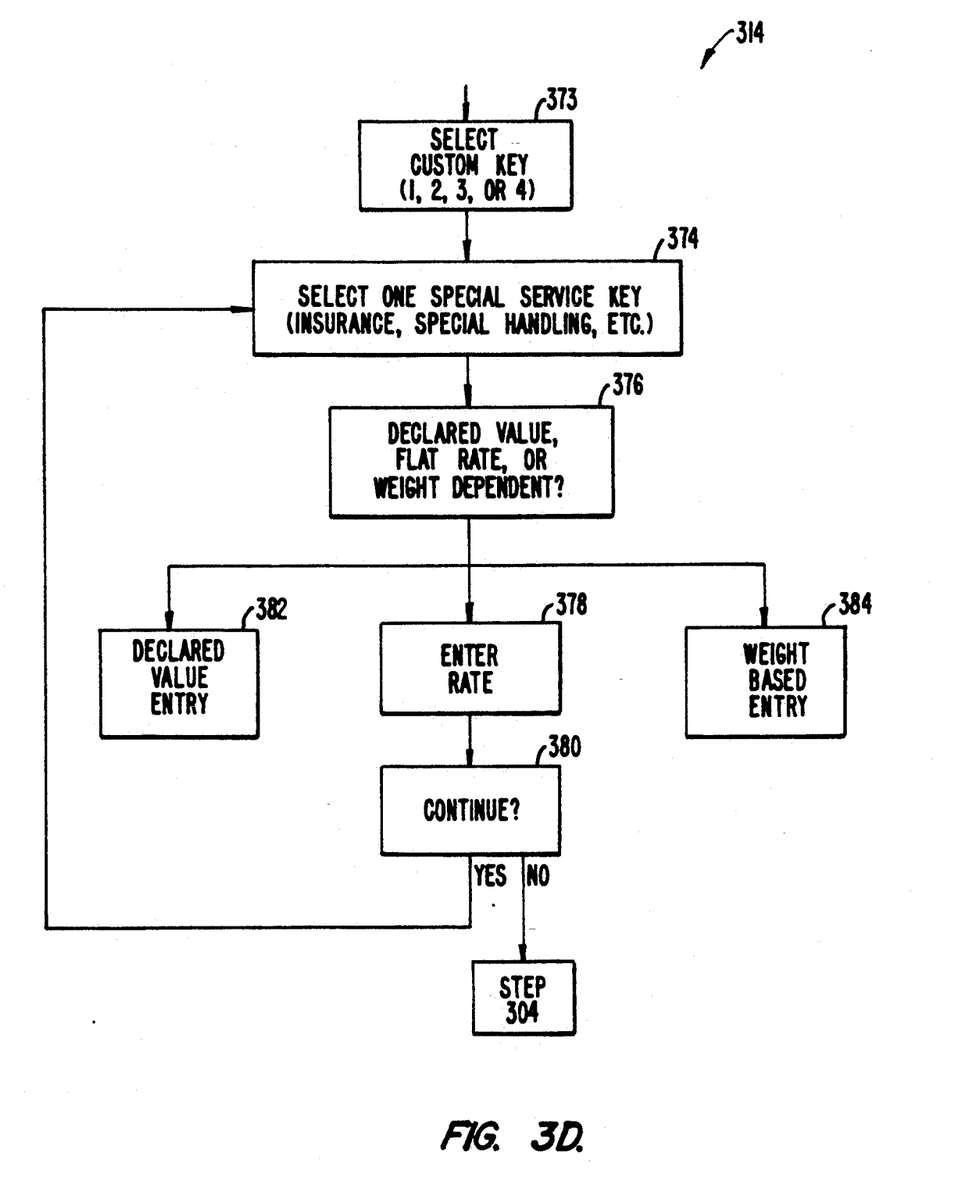

FIG. 3d illustrates operation of the special service table entry step 314 in greater detail. At step 373 the system prompts the user for which of, for example, four keys are desired for designation of the special service. At step 374 the system prompts the user for selection of which type of special service is desired, e.g., insurance, special handling, return receipt, or the like. At step 376 the system prompts the user to input whether the service is a declared value service, a flat rate service, or a weight dependent service. If the service is a flat rate service, at step 378 the system prompts the user to input the rate and then prompts the user at step 380 for a determination of whether to continue special rate entry, based on which the system either returns to the main menu (step 304) or returns to the special service menu (step 374). If the user selects declared value based special services, the system executes a series of steps for entry of a declared value table at step 382 or, if weight based entry is selected, prompts the user for entry of a weight based table at step 384.

Figure 3E:
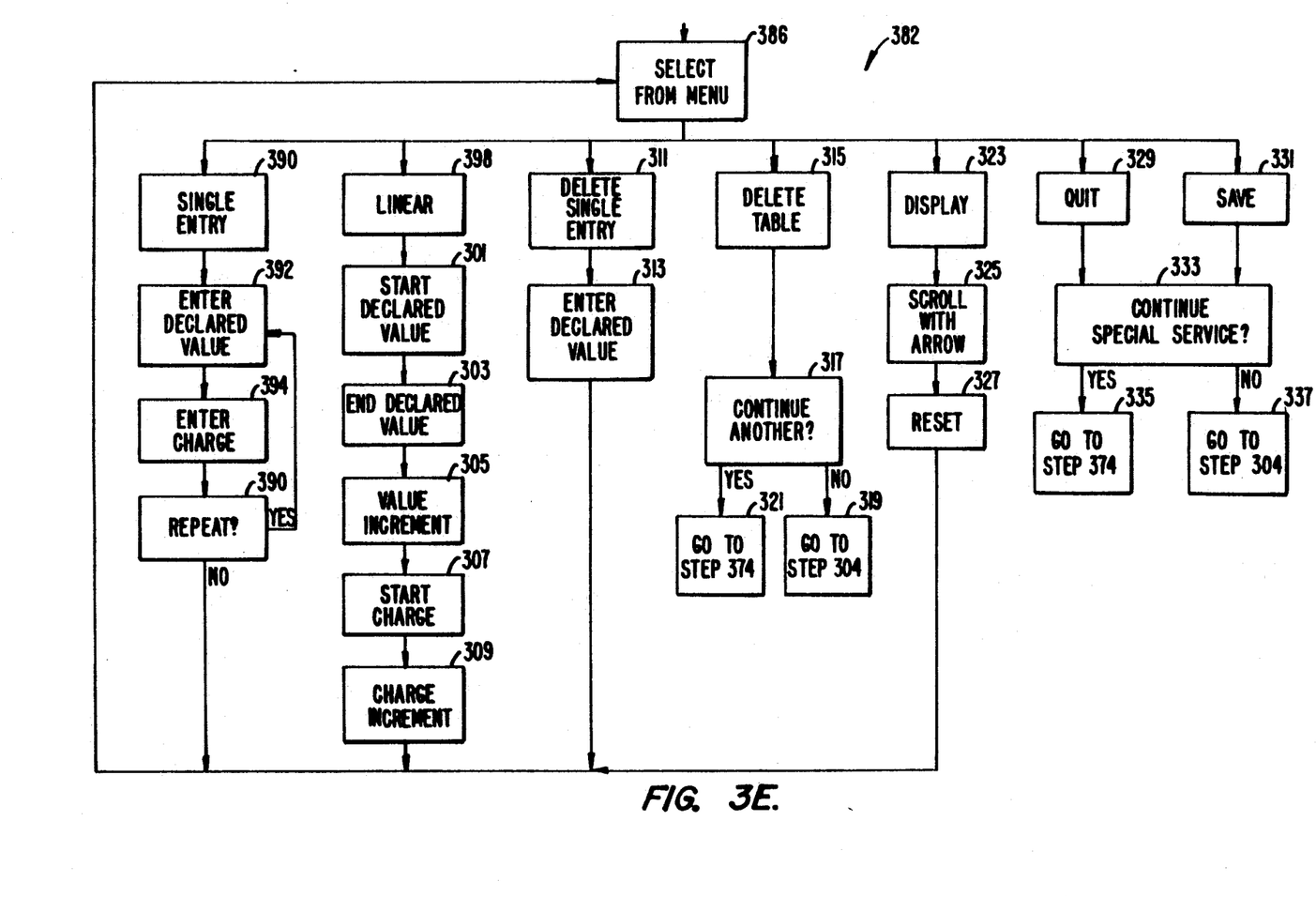

FIG. 3e illustrates the declared value based special service table entry process at step 382 in greater detail. At step 386 the system presents the user with a variety of options including single entry or linear entry of a table, deletion of single entry, deletion of a table, display of a table, saving a table, or quitting the declared value special service table entry mode. If the user selects the single entry option at step 390, the system prompts for and inputs from the user a declared value at step 392, enters the charge for that declared value at step 394, and determines if the user wishes to repeat at step 396. If the user wishes to add entries, the system returns to step 392 and repeats. If not, the system returns to the menu presentation at step 386. The values are stored in a table and used to output a stored charge for a special service when the user inputs an associated declared value.

If the user selects linear value based table entry at step 398 the system prompts for and inputs a starting declared value at step 301 and an ending declared value at step 303. The system then prompts the user and inputs a value increment, a start charge, and a charge increment at steps 305, 307, and 309, respectively. A charge increment is the incremental weight to which the value increment is applied. After a charge increment has been entered at step 309, the system returns to menu presentation at step 386. As with the linear rate system, the input values are then used to calculate in a linear fashion the cost for a special service based on a declared value input by a user for a parcel.

If the user elects to delete a single entry (step 311) the system prompts for and inputs the declared value for which a charge is to be deleted, and deletes the information associated with that declared value at step 313. The system then returns to the menu at step 386.

If the user selects the delete table option at step 315 the system deletes the current table, and prompts the user to determine if another special service entry is to be made. If so, the system returns to step 374 at step 321. If not, the system returns to step 304 at step 319. If the user selects to display a special service table at step 323, the system instructs the user to scroll with arrow at step 325. Thereafter, it allows the user to reset the system at step 327. If reset is selected, the system returns to main menu.

If the user elects to save a special service table at step 331 or quit the special service entries at step 329, the system asks the user if additional special service entries are to be made at step 333. If not, the system returns to step 304 at step 337, or returns to step 374 if the user responds in the affirmative at step 335.

Figure 3F:
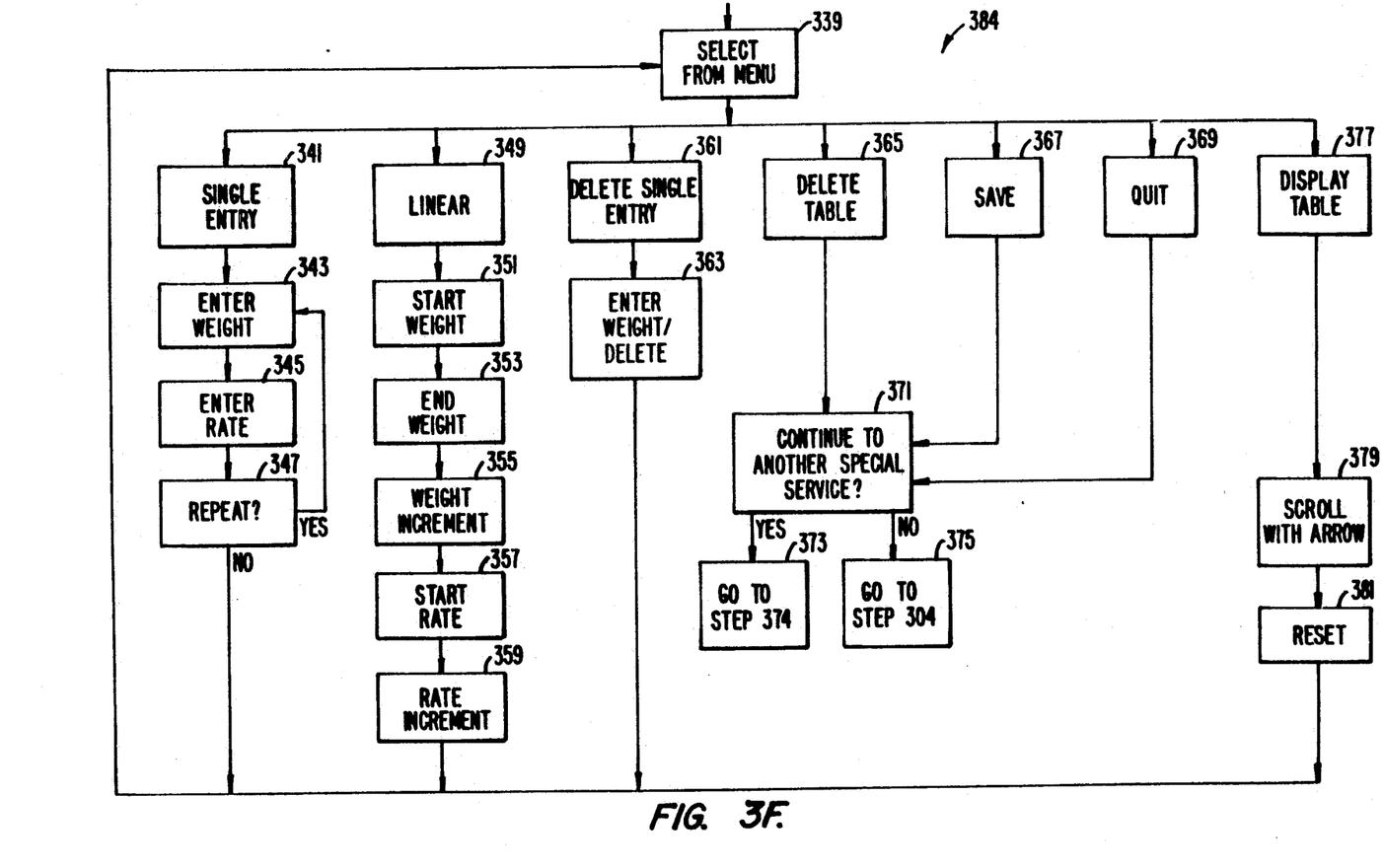

FIG. 3f illustrates the weight based special service entry step 384 in greater detail. Again, the user can select from single entry based table entry, linear table entry, deletion of single entry, deletion of a table, saving the entry, exiting the mode, or displaying of a table. If the user selects single entry at step 341 the system prompts the user and inputs a weight at step 343, and a rate at step 345. The system then asks the user if more entries are desired at step 347 and, if so, repeats to step 343. If not, the system returns the user to the menu at step 339.

If the user selects linear, weight based special service table entry at step 349, the system prompts the user and inputs a start weight at step 351, an end weight at step 353, a weight increment at step 355, a start rate at step 357 and a rate increment at step 359. Based on these inputs the system will calculate the cost of a special service based on the weight of a parcel in a linear fashion in accordance with techniques well known to those of skill in the art. After entry of these values, the system returns to step 339. If the user selects to delete a single entry at step 361, the system prompts the user to enter the weight again or to delete the selection (step 363). If the user selects to delete the selection at step 363, the selection is deleted. Thereafter, the system returns to step 339.

If the user selects deletion of a current table (step 365), the table is deleted and the user is asked at step 371 if additional special service entries are desired. If the user desires special service entries, the system goes to step 374 so that the user can select a new entry at step 373. If not, the system returns to the main menu at step 375. If so, the system returns to the special service menu at step 374. The same sequence is performed if the user saves a table at step 367, or quits this mode at step 369. As with the other modes the user can display a current table at step 377, scroll with the arrow keys at step 379, and return to the main menu by striking the reset key at step 381.

IV. User Operation

A. Overall Operation

According to the program included herewith as Appendix 1, the user of the scale disclosed herein first ensures that the scale is configured with 1, 2, 3 or 4 custom keys. The user then verifies that the rate pack is at a revision level which allows the installation of custom rates. The user then removes the operating system pack and installs the custom rate program pack. The custom data BAM pack is then installed in its appropriate slot, normally replacing the shipping transaction BAM pack.

If this is the first use of the custom data BAM pack, a main menu appears, from which the user selects the Memory Clear Option. The user then proceeds to program the desired rates. A download option is utilized when programming is complete to store the data to scale memory for normal processing. Both packs are then removed and the user installs or re-installs the regular operating software pack and the shipping transaction BAM pack. The scale will then return to normal operation. The custom rates will be enabled by selecting a "custom" key or keys. The custom key or keys may either be dedicated keys on the keyboard or one function on multiple function keys.

B. Custom Rate Programming

The custom rate programming is menu driven, and the program prompts the user for entry or further option selection throughout the program. The alphanumeric keys assigned specifically for the custom rate programming are given in FIG. 4.

Figure 5:
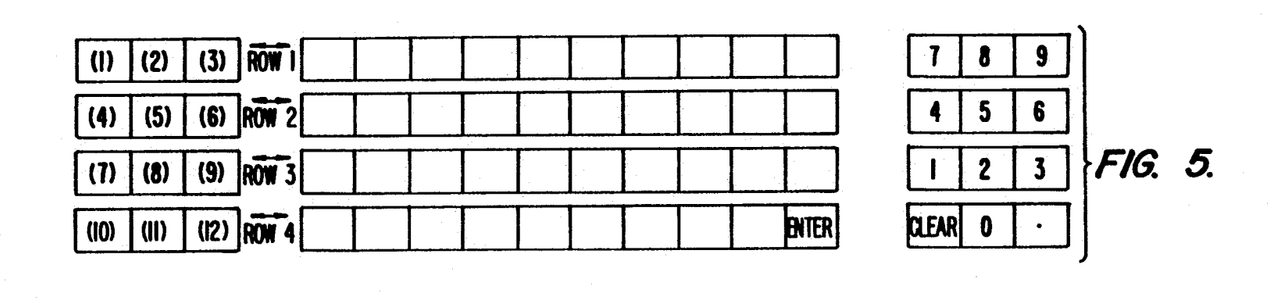
Figure 6:
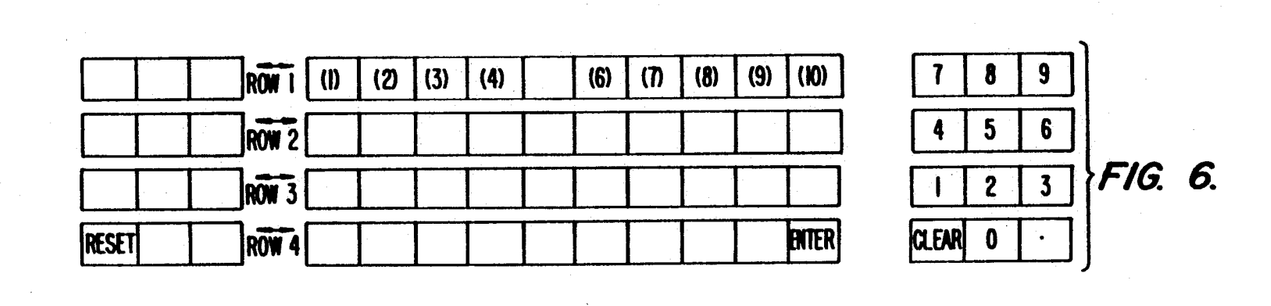

The main menu mode (304) allows selection of custom rate BAM clear, programming a new rate, and editing or changing a previously set custom rate. The key assignments for the main menu are given in FIG. 5. The main menu selection requires specific header data entry, then prompts for more options in the Edit Mode. The key assignments in the edit mode are shown in the key map in FIG. 6. Normal numeric key scales and the alpha keys used for data entry are shown in FIG. 6. In preferred embodiments, the keys contain printed information and are back-lit for prompting and easier viewing. The following rules apply to alphanumeric entries.

1. Flashing 0, CLEAR, and ENTER keys indicate that the operator must enter a numeric value. The SPACE ALPHA key also flashes for alphanumeic entry.

2. If an error is made during value entry, the operator presses CLEAR to clear all the data entered so far, or presses the BACK SPACE key to delete the last input character. The BACK SPACE key is located next to the ENTER key.

3. After the correct value is entered, the ENTER key is pressed to process the input.

Figure 4:
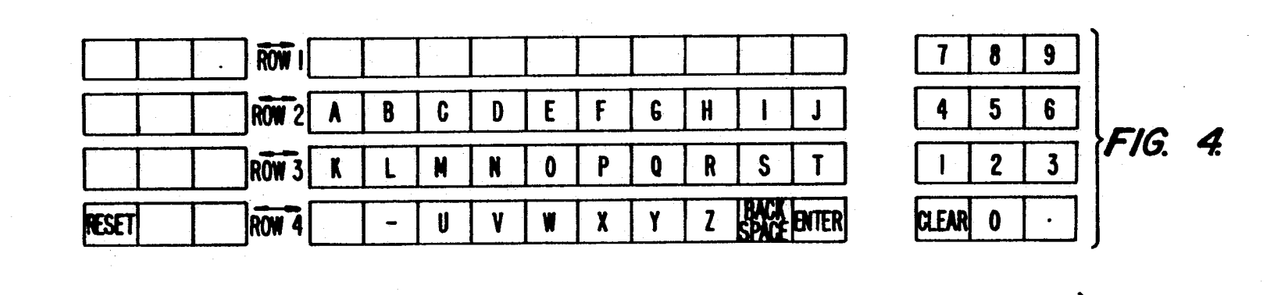
FIGS. 4 to 6 illustrate key assignments for programming the custom rates according to one embodiment of the invention.

There are eight main menu options currently available with the menu keys given on FIG. 4:

| Key | |
|---|---|
| 1 | Program New Prime Rate |
| 2 | Edit or Change an existing Custom Rate |
| 3 | Delete an Entire Custom Key |
| 4 | Memory Clear |
| 7 | Program Special Service |
| 10 | Reset |
| 11 | Download |
| 12 | Print |

To select any option in the main menu, that particular option key is pressed, followed by the ENTER key. The scale will immediately start prompting for the next entry required. Any time previous to entering the edit mode, the RESET (10) is pressed to exit the new rate programming, and the custom rate BAM will remain unchanged.

The user selects memory clear (key 4) when operating the Custom Rate Program Pack for the first time. Memory clear should be used with care since any existing rates and header data in customer BAM will be erased. Program a New Prime Rate (key 1) is pressed to program a new Prime Rate. After selecting key 1, available custom rate keys flash. The user then selects Custom Key #1, #2, #3 or #4. The scale then prompts for carrier name (or shipper name), shipping mode, and shipper ID. All fields are alphanumeric. Input is limited to six characters, except shipper ID which allows 11 characters. The scale then prompts for Meter=1, Reg=2, Neither=3. If 1 or 2 is entered, the scale prompts for the meter or register number (1-4). If 3 (neither) or any other number is selected, then register or meter is not enabled. The register or meter selected will be the one used by the scale when the results of a transaction are transmitted from the scale.

The scale then prompts 'zip-zone conversion' (Y/N). If the input entered is yes (1) then the scale will prompt "USPS=1, UPS STD=2, UPS GRND SAVER=3 or RPS=4?", which are several well known zip to zone conversions for use when, for example, special discounts are supplied by a carrier. If any other number is entered the scale will display a message that no zip-zone conversion is assumed.

The scale then requests the number of zones for this rate, e.g., for standard UPS zones 2-8, 7 would be entered as the number of zones. If the number of zones equals 0, the scale will go into the edit mode. Next, the scale requests the lowest numbered zone. This will be the first table to be entered. At this point, the scale will go into an edit mode for the custom rate table entry.

Option key 2 is selected to edit or change a Prime Rate. After pressing option key 2, the desired flashing Custom Rate Key is pressed. The scale then displays the current carrier or shipper name, the shipping mode, and the shipper ID number consecutively. Each of these may be retained by selecting the ENTER key, or changed using alpha-numeric entry. The scale then prompts for zone number entry. With a valid zone entry, the scale goes into edit mode.

The print option will print the information from the custom data pack. To print a special service, the user must print out the last zone table.

After choosing the main menu options, PROGRAM NEW RATES or EDIT/CHANGE AN EXISTING RATE, the FIG. 6 menu keymap is active. To select any of the edit mode options described below, the desired key from FIG. 6 is struck, plus the ENTER key. Alphanumeric data are entered at the information display prompts.

Pressing the RESET key allows selection of another option within the EDIT mode. To exit the EDIT mode the user must use either option SAVE or option QUIT.

All changes will be recorded on the custom data pack if the option SAVE is used. No changes will be recorded if QUIT is chosen. From FIG. 6, the key options are as follows:

| Key | |
|---|---|
| 1 | Edit One Weight and Rate at a Time: This is the simplest option to enter a rate table. The user will be prompted for a weight and its corresponding rate continuously. |
| 2 | Prompt for Rate Only: The user chooses this option if the table has equal weight increments and non-equal rate increments. |
| 3 | Linear Rate: The user chooses this option if the table has equal weight increment and equal rate increment. |
| 4 | Display Rate Table: The user selects this option to check the table just entered. |
| 6 | Delete Weight and Rate Entries: The user selects this option for each weight entry to be deleted. Both weight and rate will be erased from the rate table for that zone. |
| 7 | Delete Zone: Allows the entire table to be deleted so that new rates can be entered for that zone. |
| 8 | Find Current Status: This option is selected to find the following information. The user advances through the list with the numeric 2 key and backs up with the 8 key.<br>-Programming Custom Rate #__<br>-Programming Zone #__<br>-Carrier Name is __<br>-Shipping Mode is __<br>-Shipper ID is __<br>-Register __(Meter __) Enabled __<br>-This key has__ zones<br>-Lowest Zone __<br>-Highest Zone__<br>-App. Remaining # of entries __<br>-Current table has __ entries |
| 9 | Quit: This option will erase all information entered in the current session. |
| 10 | Save the Changes: This option will save the table in the custom data pack. |

The system also enables the entry of special services. To program special services the user strikes the Special Service option (7) from the main menu and the system prompts for entry of which custom rate key is to be used (1-4). If a key is chosen which has not yet been programmed, the scale returns to the flashing main menu. The system will then light all special service keys on the keyboard. The user then chooses the special service key desired such as COD, Special Delivery, Special Handling, Insurance, Register, Large Package, AOD. In general, there are there types of special services: declared value, flat fee, or weight dependent (higher rates for higher weight). The scale will ask which type of special service is desired: declared value, flat rate, or weight dependent. If the special service is a declared value type, the following options will be presented: Single entry, Linear, Delete (single entry), Display, Save, Quit. If the special service is a flat rate, the user will be asked for the fee. If the special service is weight dependent, the user will have the following options: Single entry, Linear, Delete (single entry), Display, Save, Quit. To input, for example, a linear rate, the user is prompted for and inputs a start weight and rate, a weight increment, and a rate increment.

Table 1 summarizes the various messages presented to a user according to the software shown in Appendix 1, along with a brief description of the user action required. The table assumes a display that is in the form of two rows of LCD characters.

TABLE 1

Scale Messages

| MESSAGES: Top Row | Bottom Row | ACTION: |
|---|---|---|
| PROMPT MESSAGES: | | |
| 1st time user: | push memory clr | STARTUP MESSAGE |
| Main menu.Select | any flash key | MAIN MENU PROMPTS |
| Program a new | prime rate? | |
| Edit or change | existing rate? | |
| Memory Clear? | | |
| Delete an entire | custom key? | |
| Reset: exiting | current mode? | |
| Down Load | | |
| Print | | |
| Program special | service? | |
| Edit mode.Select | any flash key | EDIT MODE PROMPTS |
| Enter one weight & | rate at a time? | |
| Linear Rate? | | |
| Prompt for rate | only? | |
| Delete weight & | rate entries? | |
| Delete zone? | | |
| Display tables? | | |
| Find your | current status? | |
| Save the changes | for this table? | |
| Quit DO NOT SAVE THE CHANGES? | | |
| Select cust key | | PROGRAMMING A NEW RATE |
| Carrier Name | | |
| Shipping Mode | | |
| Shipper I.D. | | |
| Enter Meter=1 | Reg=2 Neither=3 | |
| Enter Reg. #1-4 | | |
| Enter Meter #1-4 | | |
| Zip Zone Conver? | YES-1 NO-0 | |
| USPS=1 UPS STD=2 | UPS GSAV=3 RPS=4 | |
| How many zones? | | |
| Lowest Zone | | |
| Start Weight | | PROGRAMMING A LINEAR RATE |
| Maximum Weight | | |
| Weight Increment | | |
| Start Rate | | |
| Rate Increment | | |
| Enter Weight | | PROGRAMMING ONE WEIGHT & RATE |
| Enter Rate | | |
| Start Dec. Value | | PROGRAMMING DECLARED VALUE |
| Enter Dec. Value | | |
| Maximum Dec. Val. | | |
| Value Increment | | |
| Program Sp.Serv. | Select serv. key | PROGRAMMING SPECIAL SERVICES |
| Weight=0 Value=1 | Flat Fee=2 | |
| Delete zone # | YES-1 NO-0 | MISCELLANEOUS PROMPTS |
| Enter next weight | to delete | |
| Enter next value | to delete | |
| Input weight if | dif. else enter | |
| Input value if | dif. else enter | |
| Valid zones are | — Re-enter | |
| Valid zones are | — | |
| Program Zone | | |
| Print Sp.Service | YES-1 NO-0 | |
| Are you sure? | YES-1 NO-0 | Reconfirms delete an entire key |
| INFORMATIONAL MESSAGES: | | |
| CUSTOM RATE PACK | | START UP MESSAGE |
| Programming | CUSTOM RATE # | CURRENT STATUS DISPLAYS |
| Programming | zone # | |
| Carrier Name is | | |
| Shipping mode is | | |
| Shipper I.D. is | | |

TABLE 1-continued

Scale Messages

| MESSAGES: Top Row | Bottom Row | ACTION: |
|---|---|---|
| | ENABLED | Register or Meter number |
| | Zip_Zone ENABLED | Displays Zip_Zone mode |
| This key has | zones | |
| Lowest zone= | highest zone= | |
| App. remaining | of entries | Space remaining for entire key |
| Current table | has entries | # of entries in specific table |
| Assuming no zip-zone conversion | | Invalid zip-zone selection |
| Register/Meter | Not Enabled | |
| Zip_Zone | Not Enabled | |
| Pass end table | | DISPLAY TABLE MESSAGES |
| Pass start table | | |
| FIXED RATE | | DISPLAY SPECIAL SERVICE TABLE |
| Deletion is done | | MISCELLANEOUS MESSAGES |
| DownLoad is done | | |
| Memory cleared ! | | |
| Need     bytes | | With "out of memory" message |
| BAM has    left | | With "out of memory" message |
| ERROR MESSAGES: | | |
| Exceeded 300 | entry limit | Display table to see cut off |
| Maximum rate is | $655.35 | Check proper rate and re-enter |
| Can not find | Weight to delete | Display table to delete |
| Can not delete | zero weight | Display table to delete |
| Err: max weight | < start weight | Check weight entered |
| Err: max value | < start value | Check value entered |
| Exceed scale | maximum weight | Repeat with less weight |
| Key has not been | programmed | Selected unprogrammed key |
| Key already | programmed | Selected programmed key |
| Can't find rate | to delete | Display table |
| Maximum 10 zones | Re-enter | Enter 10 zones or less |
| Out of memory | | Exceeded BAM memory |

V. Conclusion

The above description is illustrative and not restrictive. Many variations of the invention will become apparent to those of skill in the art upon review of this disclosure. Merely by way of example while the invention is primarily illustrated with regard to separated physical packs for various pieces of memory, the invention is not so limited, and the functionality of one or more of the data packs could be combined. The scope of the invention should, therefore, be determined not with reference to the above description, but instead should be determined with reference to the appended claims along with their full scope of equivalents.

What is claimed is:

1. A postage scale comprising:
   a) means for determining a weight of an article to be mailed;
   b) means for calculating an amount of postage required for said article based on said weight, said means for calculating comprising central processing means, said central processing means programmed to input postage rate data and said weight, and output said amount of postage required;
   c) a first slot in said postage scale for receiving a first, read-only memory pack for storage of said postage rate data wherein said first read-only memory further comprises memory for scale operating software, and wherein said first slot alternately receives read-only memory containing programming operating software for operation of said scale during programming of said user-programmed memory pack;
   d) a second slot in said postage scale for alternately receiving:
      i) a first, transaction memory pack, said transaction memory pack storing at least transactional information based on operation of said scale; and
      ii) a second, user-programmed rate memory pack for storing said postage rate data, said user programmed rate memory pack storing rate data input by a user from an interface on said postage scale; and
   e) means for indicating said amount of postage required to a user.

2. The postage scale as recited in claim 1 further comprising a display, said display indicating said postage required during operations with said scale operating software, and prompting a user for input during operations with said programming operating software.

3. A postage scale kit comprising:
   a) a body, said body comprising a first memory pack slot and a second memory pack slot, a central processing unit disposed in said body and operably connected to said first slot, said second slot, and a CPU memory;
   b) a first read only memory pack insertable in said first slot, said first read only memory comprising standard rate data and weighing operating software, said weighing operating software adapted to calculate a cost of postage based on rate information from said CPU memory;
   c) a second read only memory pack insertable in said first slot, said second read only memory pack comprising a user rate installation program;
   d) a first battery backed up random access memory pack insertable in said second slot, said first battery backed up random access memory programmable to contain user supplied rate information using said user rate installation program, said user supplied rate information downloadable to said CPU for use with said weighing operating software;

e) second battery backed up random access memory pack insertable in said second slot, said second battery backed up random access memory adapted to store transactional data during operation of said weighing operating software; and f) a scale for weighing objects to be mailed.

4. A method of operating a postage scale comprising the steps of:

a) programming custom rate information into a random access memory pack in a first slot of said scale using a keypad on said postage scale;

b) downloading said custom rate information into a central processing unit memory in said scale;

c) removing said random access memory pack from said scale;

d) installing a transaction random access memory in said first slot; and e) weighing at least one object on said scale, transactional information from said weighing step stored in said transaction random access memory, said custom rate information used to calculate an amount of postage due.

5. The method as recited in claim 4 wherein said step of programming custom rate information further comprises the steps of:

a) in a second slot, installing a first read only memory during said programming of custom rate information, said first read only memory containing a program for said programming of custom rate information; and b) removing said first read only memory and installing a second read only memory in said second slot, said second read only memory containing a program for operation of said scale during said weighing step.

6. The method as recited in claim 5 wherein said second read only memory further contains standard postal rate information.

7. The method as recited in claim 4 wherein the step of programming custom rate information into a random access memory pack further comprises the steps of:

a) presenting a user with options of programming a new rate table, editing an existing rate table, or programming a special service;

b) prompting a user for input of a new rate table if a user selects programming a new rate table;

c) prompting a user for editing of an existing rate table if a user selects editing of a rate table; and d) prompting a user for input of a special service table if a user selects programming of a special service.

8. The method as recited in claim 7 wherein the step of prompting a user for input of a new rate table further comprises the step of inputting a zip or zone conversion method.

9. The method as recited in claim 7 wherein the step of editing a rate table further comprises the step of prompting a user for entry of corresponding rate and weight information for individual weights and rates.

10. The method as recited in claim 7 wherein the step of editing a rate table comprises the steps of prompting a user for input of base and increment rate and weight data used in a calculation of a rate based on a linear relationship between rate and weight.

11. The method as recited in claim 7 further comprising the step of prompting a user for entry of a rate table by the steps of:

a) prompting for and inputting a start weight;

b) prompting for and inputting a weight increment; and c) recursively displaying a next current weight and prompting a user for input of a rate for that weight, said next current weight calculated from a previous weight plus said weight increment.

12. The method as recited in claim 7 wherein the step of prompting a user for input of a special service table comprises the steps of:

a) prompting the user for entry of special service rates based on a flat rate, a declared value based rate, or a weight dependent rate;

b) inputting said flat rate if said user indicates a flat rate special service;

c) inputting data for a declared value based rate calculation if said user selects declared value based rate entry; and d) inputting data for weight dependent rate calculations if said user selects weight dependent rate entry.

13. The method as recited in claim 12 wherein said step of inputting data for value based rate calculation comprises alternatively the steps of:

a) recursively entering declared values and associated charges for said declared values if the user selects the corresponding menu key option; or b) entering data for a linear calculation of a special service rate based on a declared value if the user selects the corresponding menu key option.

14. The method as recited in claim 12 wherein the step of inputting data for weight dependent rate calculations comprises alternatively the steps of:

a) recursively entering weight values and associated charges for said weight values if the user selects the corresponding menu key option; or b) entering data for a linear calculation of a special service rate based on a weight value if the user selects the corresponding menu key option.

15. A postage scale comprising:

a) means for determining a weight of an article to be mailed;

b) means for calculating an amount of postage required for said article based on said weight, said means for calculating comprising:

i) central processing means, said central processing means programmable to input postage rate data and said weight, and output said amount of postage required; and ii) rate storage means for storing said postage rate data, said rate storage means storing rate data input by a user from an interface on said postage scale;

c) a first slot in said postage scale for alternately receiving:

i) a first, read only rate storage means in the form of a removable pack; and ii) a second, custom rate program pack;

d) a second slot in said postage scale for alternately receiving:

i) a first, transaction memory pack; and ii) a second, user-programmed rate memory pack; and e) means for indicating said amount of postage required to a user.

16. The postage scale as recited in claim 15 wherein said read only rate storage means further comprises memory for scale operating software.

17. The postage scale as recited in claim 15 further comprising a display, said display indicating said postage required during operations with said operating software, and prompting a user for input during operations with said programming memory pack.

18. A postage scale comprising:
   a) means for determining a weight of an article to be mailed;
   b) means for calculating an amount of postage required for said article based on said weight, said means for calculating comprising:
      i) central processing means, said central processing means programmable to input postage rate data and said weight, and output said amount of postage required; and
      ii) rate storage means for storing said postage rate data, said rate storage means storing rate data input by a user from an interface on said postage scale;
   c) means for indicating said amount of postage required to a user;
   d) a first slot in said postage scale for receiving read only rate storage means in the form of a removable pack, and wherein said first slot alternatively receives read only memory containing a program for operation of said scale during programming of said user-programmed memory pack; and
   e) a second slot in said postage scale for alternately receiving:
      i) a first, transaction memory pack; and
      ii) a second, user-programmed rate memory pack.

19. A postage scale comprising:
   a) means for determining a weight of an article to be mailed;
   b) means for calculating an amount of postage required for said article based on said weight, said means for calculating comprising:
      i) central processing means, said central processing means programmable to input postage rate data and said weight, and output said amount of postage required; and
      ii) rate storage means for storing said postage rate data, said rate storage means storing rate data input by a user from an interface on said postage scale;
   c) means for indicating said amount of postage required to a user;
   d) a first slot in said postage scale for alternately receiving:
      i) a first, read only rate storage means in the form of a removable pack; and
      ii) a second, custom rate program pack;
   e) a second slot in said postage scale for alternately receiving:
      i) a first, transaction memory pack; and
      ii) a second, user-programmed rate memory pack; and
   f) a directly memory pack installed in said postage scale, said directory memory pack containing data for enabling or disenabling entry of said rate data.

20. A postage scale comprising:
   a) means for determining a weight of an article to be mailed;
   b) means for calculating an amount of postage required for said article based on said weight, said means for calculating comprising central processing means, said central processing means programmed to input postage rate data and said weight, and output said amount of postage required;
   c) a first slot in said postage scale for alternately receiving:
      i) a first, read-only memory pack for storage of said postage rate data; and
      ii) a second, custom rate program pack;
   d) a second slot in said postage scale for alternately receiving:
      i) a first, transaction memory pack, said transaction memory pack storing at least transactional information based on operation of said scale; and
      ii) a second, user-programmed rate memory pack for storing said postage rate data, said user programmed rate memory pack storing rate data input by a user from an interface on said postage scale;
   e) a directory memory pack installed in said postage scale, said directory memory pack containing data for enabling or disenabling entry of said rate data into said user-programmed rate memory pack; and
   f) means for indicating said amount of postage required to a user.

* * * * *